March 4, 1924.
J. F. STRANAHAN ET AL
1,486,055
INNER TUBE FOR PNEUMATIC TIRES
Original Filed April 10, 1922
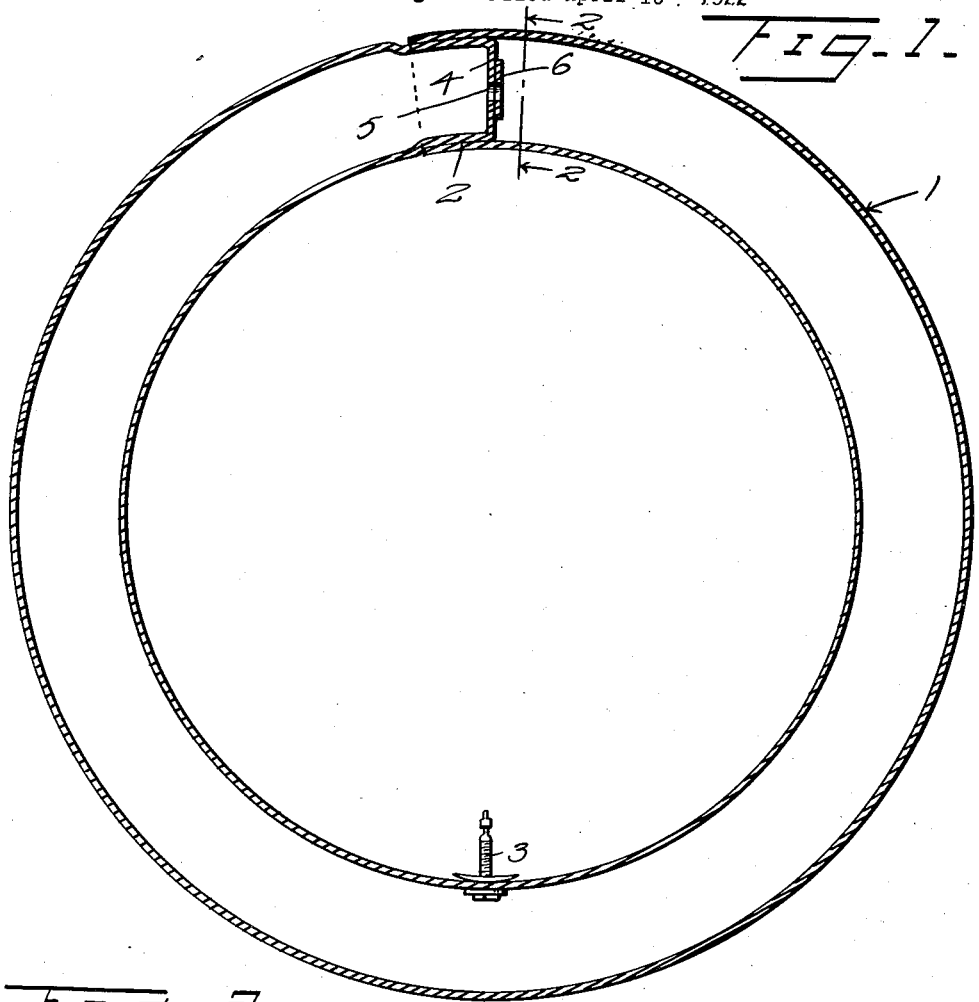
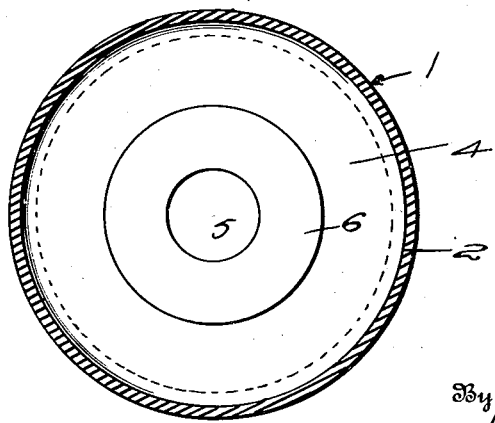
Inventor
J.F. Stranahan
J.F. Mora Patented Mar. 4, 1924.

1,486,055

UNITED STATES PATENT OFFICE.

JAMES F. STRANAHAN, OF MILWAUKEE, WISCONSIN, AND JOHN F. MORA, OF OAKLAND, CALIFORNIA.

INNER TUBE FOR PNEUMATIC TIRES.

Application filed April 10, 1922, Serial No. 551,078. Renewed July 12, 1923.

*To all whom it may concern:*

Be it known that we, JAMES F. STRANAHAN and JOHN F. MORA, citizens of the United States, residing at Milwaukee, in the county of Milwaukee and State of Wisconsin, and Oakland, in the county of Alameda and State of California, respectively, have invented certain new and useful Improvements in Inner Tubes for Pneumatic Tires; and we do hereby declare the following to be a full, clear, and exact description of the invention, such as will enable others skilled in the art to which it appertains to make and use the same.

This invention relates to new and useful improvements in tubes for pneumatic tires and has for its primary object the provision of means for retarding the circulation of air in the tube during use of the latter, consequently reducing the chances of blowouts to a minimum, as frequently blowouts are caused by the air being expanded due to heat by friction caused by the air circulating in the tube in a direction opposite to the direction in which the tire carrying the tube is rotating.

Another object of this invention is the provision of an inner tube of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawing, in which:

Figure 1 is a longitudinal sectional view, illustrating an inner tube constructed in accordance with our invention, Figure 2 is a transverse sectional view taken on the line 2—2 of Figure 1.

Referring in detail to the drawing, the numeral 1 indicates an inner tube which during its construction is formed in the usual manner by having the ends thereof positioned one within the other as shown at 2 and subjected to a vulcanizing process for the purpose of causing the ends to adhere and establish a leak-proof connection. The tube 1, at a point diametrically opposite to the vulcanized end, is provided with the usual filling or inflating valve 3. The innermost end of the tube 1 has formed therein a wall or partition 4 having a small opening 5 to permit a very slow circulation of air in the tube during the use of the device in a tire and during the rotation of the latter. The wall 4 acts as a retarder or valve to the air and by retarding the circulation of the air in the tube, the latter is prevented from being ruptured by the air becoming expanded due to heat caused by friction of the air against the walls of the tube and in a direction opposite to the direction in which the tube is rotating. We have by experiment determined that the air within an inner tube of a pneumatic tire circulates in a direction opposite to the direction of rotation of the tube, consequently causing friction between the tube and air and causing the latter to become highly heated and to expand to a high degree, causing an over due amount of pressure in the tube which causes the tube to burst, or more commonly known as a blowout. With our invention located in the tube, the circulation of the air is retarded to such an extent that friction is reduced to a minimum, consequently keeping the tube in a cool condition. With the tube kept cool, the tire or shoe in which the tube is located remains cool during the rotation thereof owing to the currents of air striking the same.

The partition 4 has secured thereto a collar or layer of material 6 for the purpose of reinforcing and strengthening the latter about the opening 5.

While we have shown and described the preferred embodiment of our invention, it will be understood that minor changes in construction, combination and arrangement of parts may be made without departing from the spirit and scope of the invention as claimed.

Having thus described our invention, what we claim is:

1. A device of the character set forth comprising a tube having its ends disposed one within the other and vulcanized, a wall formed on the innermost end of the tube and provided with an opening, and a reinforcing collar carried by said wall and surrounding the opening.

2. A device of the character specified comprising an inflatable tube, said tube having one of its ends provided with a wall having a perforation therein, the other end of the tube being open and adapted to telescopically receive the first end of the tube and be vulcanized thereto, and a reinforcing ring on said wall and surrounding said perforation, said wall serving to retard the circulating action of air in the tube.

In testimony whereof we affix our signatures in presence of two witnesses.

JAMES F. STRANAHAN.
JOHN F. MORA.

Witnesses:
R. M. DORTON,
GEO. T. OLIVER.